United States Patent
Jantsch, Sr. et al.

[11] Patent Number: 6,143,188
[45] Date of Patent: Nov. 7, 2000

[54] UNDERDRAIN BLOCK FOR FILTER MEDIA SYSTEM

[75] Inventors: Steven Mark Jantsch, Sr., Beaver Fall; Gary Hunkele, Midland, both of Pa.

[73] Assignee: Tetra Process Technologies, Tampa, Fla.

[21] Appl. No.: 09/219,292

[22] Filed: Dec. 22, 1998

[51] Int. Cl.[7] .................................................. B01D 24/46
[52] U.S. Cl. ....................... 210/794; 210/275; 210/293; 210/274
[58] Field of Search .................................. 210/274, 275, 210/794, 793, 291, 293

[56] References Cited

U.S. PATENT DOCUMENTS

| | | |
|---|---|---|
| 4,065,391 | 12/1977 | Farabaugh . |
| 4,923,606 | 5/1990 | Gresh et al. .......................... 210/275 |
| 5,108,627 | 4/1992 | Berkebile et al. ..................... 210/793 |
| 5,156,738 | 10/1992 | Maxson . |
| 5,160,614 | 11/1992 | Brown .................................. 210/275 |
| 5,269,920 | 12/1993 | Brown et al. . |
| 5,328,608 | 7/1994 | Bergmann et al. . |
| 5,489,388 | 2/1996 | Brown et al. . |
| 5,639,384 | 6/1997 | Brown et al. . |
| 5,976,645 | 11/1999 | Daluise et al. . |

*Primary Examiner*—David A. Simmons
*Assistant Examiner*—Fred Prince
*Attorney, Agent, or Firm*—Jo Katherine D'Ambrosio

[57] ABSTRACT

An underdrain block for a filter media system for supporting the filter media and distributing air and water backwash. The underdrain block comprising a top wall, a bottom wall and two side walls forming an open ended interior. Interior walls, known as lateral separation walls, divide the interior of the block into primary and secondary laterals. When the blocks are laid end to end, the laterals form a common distribution conduit for the transport of air and water backwash. The lateral separation walls can be angular or curved. Curved walls and specifically angled walls increase the area of the laterals. The spacing of the blocks can be approximately 18 inches and the height approximately 8 inches. The underdrain blocks are interlocking to form conduits of up to 40 feet in length.

27 Claims, 2 Drawing Sheets

UNDERDRAIN BLOCK FOR FILTER MEDIA SYSTEM

FIELD OF THE INVENTION

The present invention relates to an underdrain block for a filter media system. More particularly, the present invention relates to underdrain blocks used to collect filtered liquid during operation of a filtration unit and to facilitate backwashing operations.

BACKGROUND

Water, wastewater and industrial liquid filtration units typically have an underdrain system for supporting filter media such that the filter media is spaced apart from the bottom of the filter. In addition to providing support for the filter media, the underdrain system serves two primary purposes: to collect the filtered water that passes through the media and to uniformly distribute backwash water, backwash air, or a combination of both, across the filter.

Underdrain systems were often made of precast concrete blocks. The high-strength concrete blocks are placed side-by-side and end-to-end in the bottom of the filter to provide a "false bottom." The blocks provide support for the filter media and are shaped to collect the filtered water that passes through the media. Additionally, the blocks have conduits, commonly known as laterals, which allow for the passage of air or clean water used as backwash. Piping, such as air headers, are part of the backwash air distribution system. Backwash water is brought into the system by flumes. Air headers bring in pressurized air which is distributed into the laterals by pipes from the top of the headers through the flumes and into the laterals or distribution conduits.

During backwash operations, air is forced through the air distribution pipes and into the air laterals of the underdrain blocks. The pressurized air can be used as a backwash or combined with water for an air/water backwash. The pressurized air/water combination causes the filtered water to be passed upward through the media with sufficient velocity to prevent filter problems such as mud balls, filter cracking, agglomeration buildup on the media grains, and inactive areas within the filter. Underdrain blocks also act to physically separate the filter media from the air distribution pipes to prevent clogging of the orifices in the pipes by the finer particles of the filter media.

One example of an underdrain system made of precast blocks is U.S. Pat. No. 4,923,606 to Gresh et al. The underdrain blocks disclosed in the '606 reference are a combination of a plastic jacket and a concrete mold. The underdrain blocks in the '606 reference are used for both upflow and downflow filtration units. Thus, the blocks provide distribution of liquid and air during backwash operations.

U.S. Pat. No. 5,160,614 to Brown discloses an underdrain system comprised of a series of modular, interconnected air duct blocks. In the '614 reference, the row of air duct blocks extend transversely to a plurality of laterals. The laterals are defined by the connection of individual underdrain blocks in parallel adjacent rows. The air duct blocks are interconnected such that the interiors of the separate air duct blocks are in fluid communication with one another to supply backwash gas through a single source of gas supply.

U.S. Pat. No. 5,108,627 to Berkebile et al. discloses an underdrain system comprised of blocks having a plurality of exterior and interior walls. The walls of the '627 reference define a plurality of interior chambers having at least a first and second conduit parallel to the longitudinal axis of the blocks. The interior walls defining the interior chambers provide bearing support for the top wall of the block and are disposed to provide even distribution of backwash flows which are facilitated by separate conduits within the interior chambers.

Because air/water backwash is superior to either backwash alone, there is a need for a new and improved underdrain system that allows both air laterals and water laterals during the liquid filter treatment. Existing shortened underdrain blocks that are capable of carrying both air and water backwash are limited to sixteen foot conduits because the area of the primary laterals is not large enough to carry large volumes of water, (the area of prior art shortened blocks is approximately 33 square inches.) Most existing underdrain blocks are twelve inches in height. Shorter blocks currently in use are limited in the volume of backwash air and water that they can carry.

SUMMARY

The underdrain block of the present invention comprises blocks that provide longer distribution conduits or laterals for the underdrain system of a filter unit. The new and improved underdrain block is configured for easier installation and manufactured at a substantially lower cost as compared to standard underdrain blocks. Because the present underdrain blocks are shorter than prior art blocks, the blocks of this invention provide more space for additional filter media or for additional freeboard between the top of the media and the bottom of the filter troughs. The blocks of this invention conduct larger quantities of air/water backwash than other blocks having the same height. The shape of the lateral separation wall gives the block more primary lateral area as compared to prior art blocks, approximately ⅓ more area per square foot of filter area.

Shorter blocks minimize dead zones in a filter. The underdrain blocks of the present invention are conveniently wider than previous blocks so that the underdrain system can comprised fewer blocks thereby reducing installation time.

One preferred underdrain block for a filter media system comprises: a top wall, a bottom wall, and two side walls connecting the top wall to the bottom wall; a plurality of interior walls defining at least two primary distribution conduits, the interior walls further defining at least two secondary conduits, the secondary distribution conduits separated from the primary distribution conduits by one or more lateral separation walls, the lateral separation wall having an upper portion and a lower portion; and a center separation wall extending between the top wall and the bottom wall, the center separation wall separating the two primary distribution conduits from each other, the center separation wall further separating the two secondary distribution conduits from each other.

Preferably, the primary distribution conduit comprises an upper area, a middle area and a lower area, the upper area for transporting air and the lower area for transporting water and the middle area comprising an air/water interface. The preferred secondary distribution conduit comprises a mixture of air and water. The upper portion of the lateral separation walls can define a plurality of air distribution orifices and the lower portion of the lateral separation walls can define a plurality of water distribution orifices. The top wall can define a plurality of air and water discharge holes.

Preferably, the side walls have an inner surface and an outer surface, and the distance between the outer surfaces of the two side walls comprises the width of the underdrain block, the width measuring within a range of from about 12 inches to about 24 inches. More preferably, the side walls have an inner surface and an outer surface, and the distance between the outer surfaces of the two side walls comprises the width of the underdrain block, the width measuring approximately 18 inches. The height of the underdrain block can be within a range of from about 6 inches to about 10 inches. Preferably, the height of the underdrain block is approximately 8 inches.

In one embodiment, the center separation wall is divisible so that the underdrain block is separable into two or more smaller blocks. The lateral separation wall can be angled. Alternatively, the lateral separation wall is curved. Preferably, adjacent underdrain blocks are interconnected by a locking mechanism. The locking mechanism can comprise a bell and a spigot, the spigot comprising snap lock tabs. A plurality of interlocked underdrain blocks preferably form a common primary distribution conduit comprising a length within a range of from about 20 to about 40 feet. Preferably, a plurality of interlocked underdrain blocks form a common secondary distribution conduit comprising a length within a range of from about 20 to about 40 feet.

Another preferred underdrain block for a filter media system having an air backwash and a water backwash system, comprises: a top wall, the top wall defining a plurality of air and water discharge holes; a bottom wall, and two side walls connecting the top wall to the bottom wall, the side walls have an inner surface and an outer surface,. The preferred distance between the outer surfaces of the side walls is within a range of from approximately 12 inches to approximately 24 inches. Preferably, a plurality of interior walls defining a first primary lateral and a second primary lateral, the interior walls further defining a first secondary lateral and a second secondary lateral, the secondary laterals separated from the primary laterals by one or more lateral separation walls, the lateral separation walls having an upper portion and a lower portion, the upper portion of the lateral separation walls defining a plurality of air distribution orifices, the lower portion of the lateral separation walls defining a plurality of water distribution orifices; and a center separation wall extending between the top wall and the bottom wall, the center separation wall separating the first primary lateral from the second primary lateral and the center separation wall further separating the first secondary lateral from the second secondary lateral.

One preferred block further comprises a first end and a second end wherein the first end comprises a bell, the second end comprises a spigot and the spigot end comprises snap lock tabs so that adjacent blocks are held together by a locking mechanism. In one aspect, the primary lateral comprises an upper area, a middle area and a lower area, the upper area for transporting air and the lower area for transporting water and the middle area comprising an air/water interface. In another aspect, the secondary lateral comprises an area for transporting a mixture of air and water. Preferably, the distance between the outer surfaces of the two side walls measures approximately 18 inches wherein the height of the underdrain block is within a range of from about 6 inches to about 10 inches. More preferably, the height of the underdrain block is approximately 8 inches.

In another aspect, the center separation wall is divisible so that the underdrain block is separable into two or more smaller blocks. Preferably, the lateral separation wall between the top wall and the bottom wall is angled. Alternatively, the lateral separation wall between the top wall and the bottom wall is curved. In one preferred embodiment, a plurality of interlocked underdrain blocks form a common secondary distribution conduit comprising a length within a range of from about 20 to about 40 feet.

DETAILED DESCRIPTION OF DRAWINGS

Broadly, the underdrain block of this invention comprises a block that both supports filter media, separates the filter media from effluent filtrate and provides a channel for distribution of air and water backwash throughout the system. The preferred underdrain block is shorter in height and wider than previous underdrain blocks. When the underdrain blocks of the present invention are interlocked, they form distribution conduits or laterals that are longer then previous underdrain systems. The longer the lateral, the more the volume of air/water has to travel down the length of the lateral because of its larger primary lateral area. A pressure drop can occur because of friction along the walls of the laterals, resulting in uneven distribution of the air/water backwash. The present invention can conduct air and water backwash for a longer lateral distance with even distribution of the backwash throughout the filter system. Longer laterals allow the underdrain blocks of this invention to be used in larger filters. Also, because the underdrain block is shorter than previous blocks, more space is allowed for additional filter media or freeboard thereby improving the efficiency of the filter media system. Increased width of the present underdrain block allows filters to use fewer blocks thereby decreasing installation time.

The curved and angular lateral separation walls of this invention allow larger volumes of air and water to be transported down the length of the lateral and therefore, improved distribution of backwash. Because the underdrain block of the present invention comprises a center separation wall, the underdrain block can be halved without loss of strength necessary to support the media. This allows for easier installation in filters having widths that are not multiples of the blocks.

Figure 1:
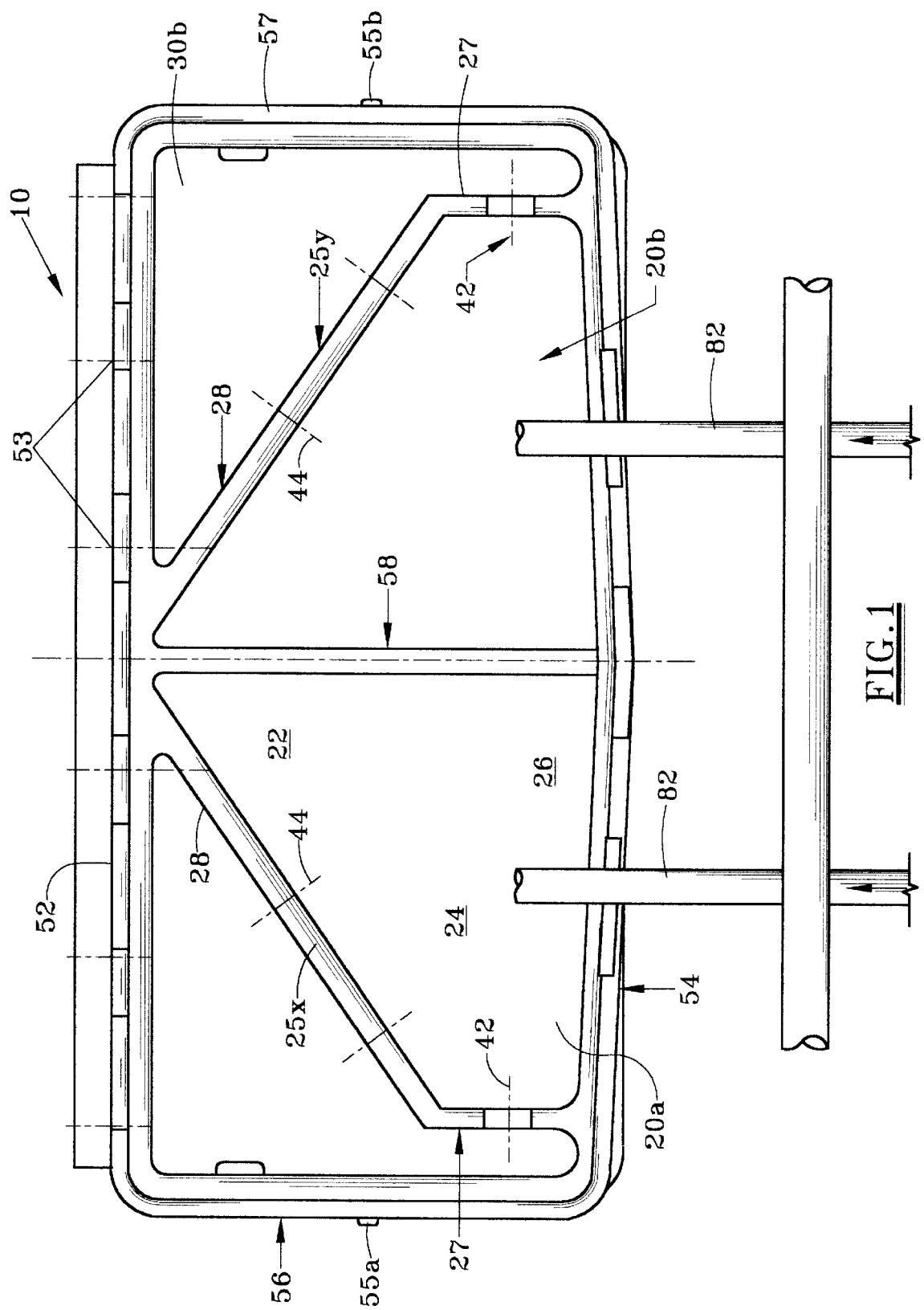
FIG. 1 is a cross-section of one embodiment of the present invention illustrating an angled lateral separation wall.

Referring to the drawings, FIG. 1 illustrates one preferred embodiment of this invention. Broadly the preferred underdrain block 10 comprises a top wall 52, a bottom wall 54, two sides wall 56, 57 and a plurality of interior walls 25x, 25y, 58 which define a plurality of primary laterals 20a, 20b and a plurality of secondary laterals 30a, 30b. The primary laterals 20a, 20b and secondary laterals 30a, 30b extend parallel to the longitudinal axis of the underdrain block 10 and to each other thereby forming a distribution channel for air and water when a plurality of blocks 10 are interlocked together. Wastewater filtered through the filtration system passes down through to the secondary conduits into the primary laterals 20a, 20b and out either the bottom through holes cut in the block 10 or thought holes in the end of the laterals 20a, 20b. Backwash air and backwash water travel horizontally through the primary laterals and are transmitted to the secondary laterals into the filter media by air and water orifices 42, 44 in the lateral separation wall 25x, 25y. The backwash air and water travel vertically through the secondary laterals 30a, 30b and into the filter media (not shown). Air piping or headers 80 lie under the bottom wall 54 to feed pressurized air into the laterals 20a, 20b for air backwashing of the filter system. Air riser piping 82 comes off the bottom of the air header and pipes air into the underdrain block 10. Alternatively, the air headers can feed into the block 10 from above and enter the block through drop pipes (not shown). Flumes on the floor of the filter (not shown) carry effluent water away from the filter and backwash water into the primary laterals 20a, 20b. The primary laterals 20a, 20b are a common distribution conduit for the transport air and water. Preferably, the primary laterals 20a, 20b comprise an upper area 22 for transporting air, a lower area 26 for transporting water and a middle area 24 where the air and water interface. Lateral separation walls 25x, 25y separate the primary laterals 20a, 20b from the secondary laterals 30a, 30b. The lateral separation walls 25x, 25y comprise an upper section 28 and a lower section 27. The upper section 28 defines a plurality of air distribution orifices 44 for communication between the primary laterals 20a, 20b and secondary laterals 30a, 30b. The lower section 27 defines a plurality of water distribution orifices 42 for communication between the primary laterals 20a, 20b and secondary laterals 30a, 30b. Preferably, the underdrain block 10 comprises a first primary lateral 20a, a second primary lateral 20b, a first secondary lateral 30a and a second secondary lateral 30b.

A center separation wall 58 extends between the top wall 52 and the bottom wall 54 to separate the first primary lateral 20a from the second primary lateral 20b and the first secondary lateral 30a from the second secondary lateral 30b. The sturdy center separation wall 58 allows the underdrain block 10 to be cut in half so as to fit in filters having widths with less than a multiple of the width of the underdrain block.

Figure 2:
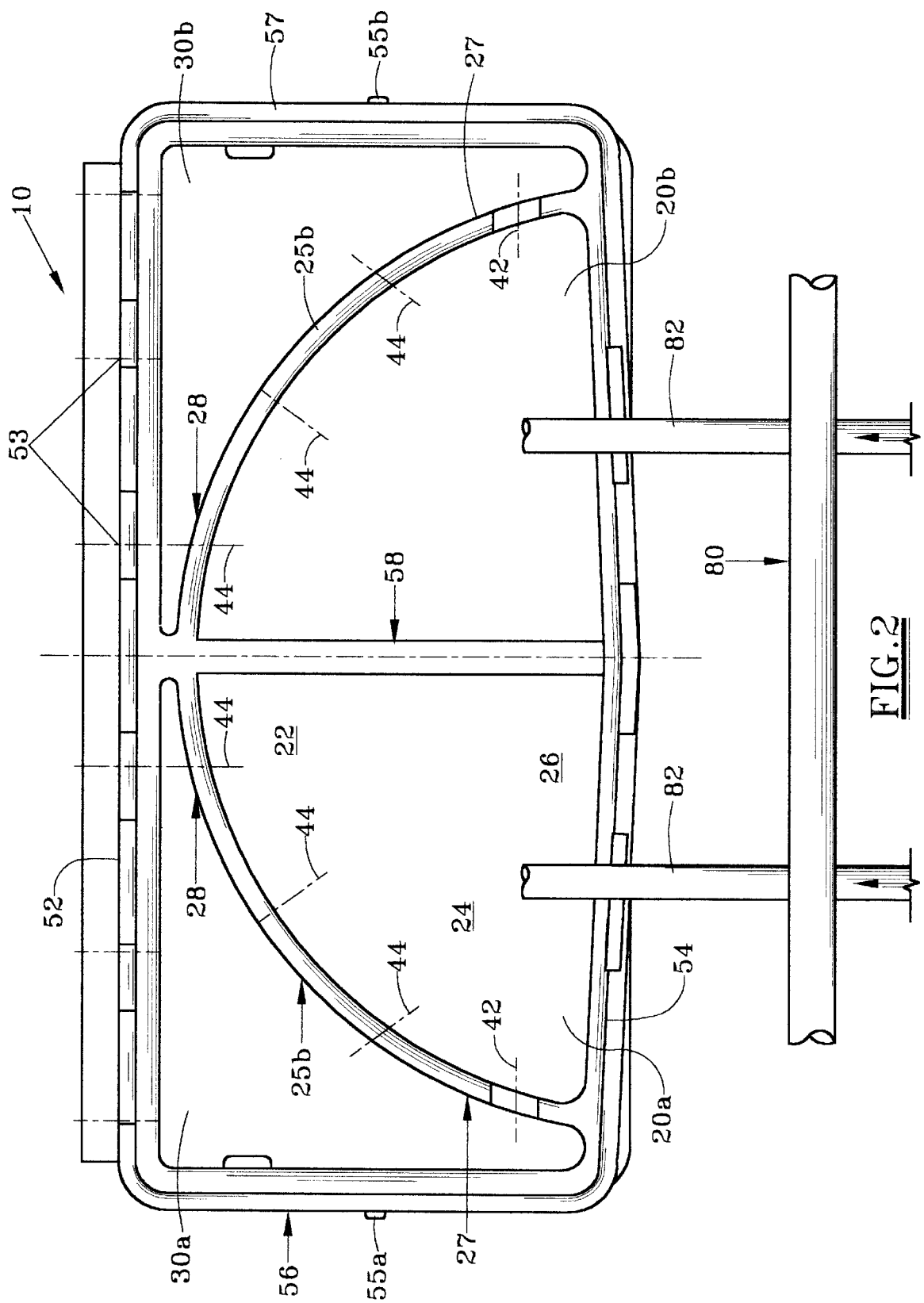
FIG. 2 is a cross-section of another embodiment illustrating a curved lateral separation wall.

In one preferred embodiment, as illustrated in FIG. 2, the lateral separation wall is curved 25a, 25b. Alternatively, FIG. 1 depicts an underdrain block comprising an angular lateral separation wall 25x, 25y. The configuration of the interior of the primary and secondary laterals 20a, 20b, 30a, 30b causes more even distribution of the backwash air and water. The lateral separation walls 25x, 25y provide a larger area for the primary laterals 20a, 20b which transports backwash air down the length of the lateral. Underdrain blocks 10 with curved lateral separation walls 25a, 25b preferably comprise approximately 68.2 square inches of primary lateral area as compared to blocks with angular separation walls 25x, 25y which comprise approximately 65.4 square inches of primary lateral area. The primary lateral area of the angular lateral wall block FIG. 1, 10 is also larger because the lateral walls 25x, 25y rises perpendicularly from the bottom wall 54 and than angles off to the top, preferably, at an 122° angle. As a result, the laterals 20a, 20b, 30a, 30b can be longer thereby allowing for a more even distribution of air throughout the filter media. The higher volume of air/water at low enough velocity that pressure drop because of friction is reduced thereby maintaining even distribution. The present underdrain blocks 10 can be interlocked to form laterals 20a, 20b, 30a, 30b up to approximately 40 feet maintaining air and water distribution at a given point of plus or minus 5% of the industry standard average. Up to the present invention, laterals could only be 16 feet in length.

The underdrain block 10 of the this invention is designed for lateral spacing of from 12 to 24 inches as compared to the twelve inch spacing of prior art blocks. The preferred spacing is 18 inches. Eighteen inch spacing preferably requires an underdrain block 10 having a width that is approximately within a range of 17 inches to 17½ inches to allow for a gap that is grouted. Grout holds the blocks together. A width of 18 inches requires two thirds the number of blocks 10 required by the 12 inch width. Less blocks 10 reduces the installation time for the filter system. In addition, because the unique underdrain block of this invention comprises a center separation wall 22, 58 which is easily cut, each nine inch halve forms a complete block with a primary lateral 20a, 20b and secondary lateral 30a, 30b. The half blocks can be adapted to areas of the filter floor in which the width is not a multiple of the 18 inch block, again reducing installation time.

The height of the preferred underdrain block 10 is within a range of approximately 6 inches to 10 inches, with a more preferred height of 8 inches. The 8 inch height is 4 inches less than prior art blocks. This gain of 4 inches allows the filter either 4 inches more of media depth or 4 inches more of freeboard between the top of the media and the bottom of the filter trough.

The primary laterals 20a, 20b and secondary laterals 30a, 30b extend parallel to the longitudinal axis of the underdrain block 10 and to each other thereby forming the common distribution conduit for air and water. Preferably, a plurality of blocks 10 are interlocked together. In one preferred embodiment, the underdrain block 10 comprises a first end 56 and a second end 57. The first end comprises a bell 55a that interlocks with a spigot 55b positioned on the second end 57 of the block 10. The interlocking blocks 10 of this invention can be installed in filter systems having widths ranging from 3 feet up to 40 feet thereby fulfilling the need of a 40 foot lateral (or distribution conduit) in the larger filter systems. The spigot 55b and bell 55a interlocking system create a close fit between blocks 10 to prevent air and water from entering or exiting the laterals 20a, 20b, 30a, 30b of the block 10. The blocks are held together by snap lock tabs (not shown) molded into the spigot end 55b of the block 10. Preferably, an O-ring can be used to further seal the blocks 10.

In one preferred embodiment the underdrain blocks 10 are molded in to the preferred configurations described above. Preferably the blocks are formed from light weight high density injection molded plastic such as polyethylene.

The foregoing description is illustrative and explanatory of preferred embodiments of the invention, and variations in the size, shape, materials and other details will become apparent to those skilled in the art. It is intended that all such variations and modifications which fall within the

What is claimed is:

1. An underdrain block for a filter media system, the underdrain block comprising:

a top wall, a bottom wall, and two side walls connecting the top wall to the bottom wall, wherein the height of the underdrain block is within a range of approximately 7 inches to approximately 9 inches;

a plurality of interior walls defining at least two primary distribution conduits, the interior walls further defining at least two secondary conduits, the secondary distribution conduits separated from the primary distribution conduits by one or more lateral separation walls, the lateral separation wall having an upper portion and a lower portion;

the lower portion of the lateral separation wall perpendicular to the bottom wall, the upper portion of the lateral separation wall slanted at an angle within the range of between approximately 120° to 125°; and a center separation wall extending between the top wall and the bottom wall, the center separation wall separating the two primary distribution conduits from each other, the center separation wall further separating the two secondary distribution conduits from each other, the center wall comprising a thickness that is divisible so that the underdrain block is separable into two usable half-sized blocks.

2. The underdrain block of claim 1 wherein the primary distribution conduit comprises an upper area, a middle area and a lower area, the upper area for transporting air and the lower area for transporting water and the middle area comprising an air/water interface.

3. The underdrain block of claim 1 wherein the secondary distribution conduit comprises a mixture of air and water.

4. The underdrain block of claim 1 wherein the upper portion of the lateral separation walls define a plurality of air distribution orifices.

5. The underdrain block of claim 1 wherein the lower portion of the lateral separation walls define a plurality of water distribution orifices.

6. The underdrain block of claim 1 wherein the top wall define a plurality of air and water discharge holes.

7. The underdrain block of claim 1 wherein the side walls have an inner surface and an outer surface, and the distance between the outer surfaces of the two side walls comprises the width of the underdrain block, the width measuring within a range of from about 12 inches to about 24 inches.

8. The underdrain block of claim 1 wherein the side walls have an inner surface and an outer surface, and the distance between the outer surfaces of the two side walls comprises the width of the underdrain block, the width measuring approximately 18 inches.

9. The underdrain block of claim 1 wherein the height of the underdrain block is approximately 8 inches.

10. The underdrain block of claim 1 wherein the center separation wall is divisible so that the underdrain block is separable into two or more smaller blocks.

11. The underdrain block of claim 1 wherein the lateral separation wall is angled.

12. The underdrain block of claim 1 wherein the lateral separation wall is curved.

13. The underdrain block of claim 1 wherein adjacent underdrain blocks are interconnected by a locking mechanism.

14. The underdrain block of claim 13 wherein the locking mechanism comprises a bell and a spigot, the spigot comprising snap lock tabs.

15. The underdrain block of claim 1 wherein a plurality of interlocked underdrain blocks form a common primary distribution conduit comprising a length within a range of from about 20 to about 40 feet.

16. The underdrain block of claim 1 wherein a plurality of interlocked underdrain blocks form a common secondary distribution conduit comprising a length within a range of from about 20 to about 40 feet.

17. An underdrain block for a filter media system comprising an air backwash and a water backwash system, the underdrain block comprising:

a top wall, the top wall defining a plurality of air and water discharge holes;

a bottom wall, and two side walls connecting the top wall to the bottom wall, the side walls have an inner surface and an outer surface, wherein the distance between the outer surfaces of the side walls is within a range of from approximately 12 inches to approximately 24 inches and the height of the underdrain block is within a range of approximately 7 inches to approximately 9 inches;

a plurality of interior walls defining a first primary lateral and a second primary lateral, the interior walls further defining a first secondary lateral and a second secondary lateral, the secondary laterals separated from the primary laterals by one or more lateral separation walls, the lateral separation walls having an upper portion and a lower portion, the upper portion of the lateral separation walls defining a plurality of air distribution orifices, the lower portion of the lateral separation walls defining a plurality of water distribution orifices;

the lower portion of the lateral separation wall perpendicular to the bottom wall, the upper portion of the lateral separation wall slanted at an angle within the range of between approximately 120° to 125°; and a center separation wall extending between the top wall and the bottom wall, the center separation wall separating the first primary lateral from the second primary lateral and the center separation wall further separating the first secondary lateral from the second secondary lateral, the center wall comprising a thickness that is divisible so that the underdrain block is separable into two usable half-sized blocks.

18. The underdrain block of claim 17 further comprising a first end and a second end wherein the first end comprises a bell, the second end comprises a spigot and the spigot end comprises snap lock tabs so that adjacent blocks are held together by a locking mechanism.

19. The underdrain block of claim 17 wherein the primary lateral comprises an upper area, a middle area and a lower area, the upper area for transporting air and the lower area for transporting water and the middle area comprising an air/water interface.

20. The underdrain block of claim 17 wherein the secondary lateral comprises an area for transporting a mixture of air and water.

21. The underdrain block of claim 18 wherein the distance between the outer surfaces of the two side walls measures approximately 18 inches.

22. The underdrain block of claim 17 wherein the height of the underdrain block is within a range of from about 6 inches to about 10 inches.

23. The underdrain block of claim 17 wherein the height of the underdrain block is approximately 8 inches.

24. The underdrain block of claim 17 wherein the center separation wall is divisible so that the underdrain block is separable into two or more smaller blocks.

25. The underdrain block of claim 17 wherein the lateral separation wall between the top wall and the bottom wall is angled.

26. The underdrain block of claim 17 wherein the lateral separation wall between the top wall and the bottom wall is curved.

27. The underdrain block of claim 17 wherein a plurality of interlocked underdrain blocks form a common secondary distribution conduit comprising a length within a range of from about 20 to about 40 feet.

* * * * *

UNITED STATES PATENT AND TRADEMARK OFFICE
Certificate

Patent No. 6,143,188

Patented: November 7, 2000

On petition requesting issuance of a certificate for correction of inventorship pursuant to 35 U.S.C. 256, it has been found that the above-identified patent, through error and without deceptive intent, improperly sets forth the inventorship.

Accordingly, it is hereby certified that the correct inventorship of this patent is: Steven Mark Jantsch, Sr., Beaver Fall, PA; Gary Hunkele, Midland, PA; and Navin Kadakia, Bridgeville, PA.

Signed and Sealed this Twenty-Fifth Day of September 2001.

DAVID A. SIMMONS
*Supervisory Patent Examiner*
Art Unit 1724